United States Patent [19]
Mardon et al.

[11] Patent Number: 5,023,048
[45] Date of Patent: Jun. 11, 1991

[54] ROD FOR A FUEL ASSEMBLY OF A NUCLEAR REACTOR RESISTING CORROSION AND WEAR

[75] Inventors: Jean-Paul Mardon, Caluire; Daniel Charquet, Albertville; Marc Perez, Levallois; Jean Senevat, Saint Brevin les Pins, all of France

[73] Assignees: Framatome, Courbevoie; Cogema, Velizy Villacoublay; Compagnie Européenne du Zirconium dite Cezus; Société en Nom Collectif Zircotube, both of Courbevoie, all of France

[21] Appl. No.: 468,330

[22] Filed: Jan. 22, 1990

[30] Foreign Application Priority Data

Jan. 23, 1989 [FR] France ................... 89 00761

[51] Int. Cl.$^5$ ................................................. G21C 3/06
[52] U.S. Cl. .................................................. 376/416
[58] Field of Search ............... 376/416, 414, 417; 427/6

[56] References Cited
U.S. PATENT DOCUMENTS
4,783,311 11/1988 Ferrari ................ 376/417

FOREIGN PATENT DOCUMENTS
0195155 9/1986 European Pat. Off. .
0212351 3/1987 European Pat. Off. .
1202985 10/1965 Fed. Rep. of Germany .
62-191792 8/1987 Japan ................ 376/416

OTHER PUBLICATIONS
"Performance and Testing of Refractory Alloy Clad Fuel Elements for Space Reactors", by D. S. Dutt et al.,-Los Alamos National Laboratory-U.S.A.

Primary Examiner—Daniel D. Wasil
Assistant Examiner—Meena Chelliah
Attorney, Agent, or Firm—Pollock, Vande Sande & Priddy

[57] ABSTRACT

The fuel rod comprises a sheath having an inner tubular layer and an outer surface layer composed of zirconium alloys which differ from each other. The surface layer, whose thickness is between 10 to 25% of the total thickness of the wall of the sheath, is constituted by a zirconium-base alloy containing by weight 0.35 to 0.65% tin, 0.20 to 0.65% iron, 0.09 to 0.16% oxygen and niobium in a proportion of 0.35 to 0.65% or vanadium in a proportion of 0.25 to 0.35%. The inner layer may be constituted by an alloy such as Zircaloy 4 or a zirconium-niobium alloy.

8 Claims, 1 Drawing Sheet

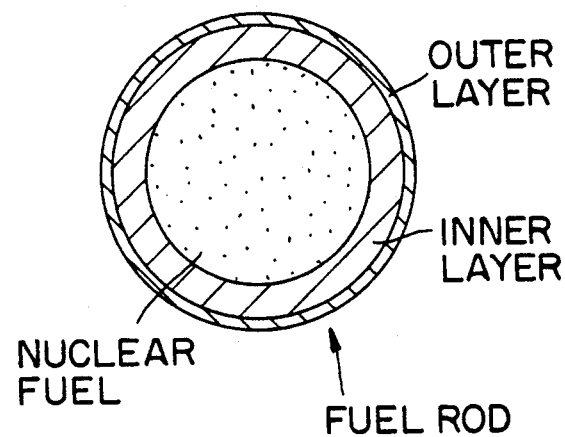

ROD FOR A FUEL ASSEMBLY OF A NUCLEAR REACTOR RESISTING CORROSION AND WEAR

FIELD OF THE INVENTION

The invention relates to a rod for a fuel assembly of a nuclear reactor having improved resistance to corrosion and wear.

BACKGROUND OF THE INVENTION

Fuel assemblies of water-cooled nuclear reactors and in particular pressurized water nuclear reactors comprise a framework in which are introduced fuel rods constituted by a sheath enclosing a nuclear fuel material, such as uranium or plutonium oxide in the form of sintered pellets.

The sheath constructed from a tube of zirconium alloy must have good resistance to corrosion under the effect of the primary fluid circulating in contact with the outer surface of the sheath.

For forming the sheath of fuel rods of assemblies of water-cooled reactors there is usually employed alloy including principally 1.2 to 1.7% tin, 0.18 to 0.24% iron and 0.07 to 0.13% chromium or a zirconium alloy including 1.2 to 1.7% tin, 0.07 to 0.2% iron, 0.05 to 0.15% chromium and 0.03 to 0.08% nickel.

In order to improve the performances as concerns corrosion under irradiation of the sheaths of fuel rods in the environment of the nuclear reactor in operation and thereby prolong the life of the fuel assemblies in the core, there have been proposed modifications or adjustments in the composition of the aforementioned zirconium alloys or replacements by alloys including elements such as vanadium, niobium or copper.

However, these alloys do not present decisive advantages over currently employed alloys whose composition is mentioned hereinbefore, in that their mechanical characteristics and in particular their hardness and their resistance to wear are usually lower than those of the currently employed compositions.

In addition to the corrosion of their outer surface exposed to the cooling fluid of the nuclear reactor, the sheaths undergo internal corrosion due in particular to the interaction between the fuel pellets and the inner surface of the sheath. In order to reduce this internal corrosion, it has been proposed to deposit a layer of insulation between the pellets and the sheath.

It has also been proposed in patent application EP-A-0,212,351 to construct the sheath in the form of a duplex tube comprising a tubular inner layer of zirconium alloy of the conventional type such as described hereinbefore and a surface layer improving the resistance to corrosion of the sheath composed of zirconium alloy different from the alloy constituting the inner layer and including iron and at least one of the elements vanadium, platinum and copper. This surface layer, whose thickness represents 1 to 20% of the total thickness of the wall of the sheath, may be produced by extrusion of a blank constituted by an inner tube of zirconium alloy of conventional composition on which is mounted an outer tube having the composition of the surface layer.

The sheath is then rolled in a step-by-step rolling mill down to its definitive diameter.

The fuel rods, whose sheath is constituted by a duplex tube, present a generalized outer corrosion resistance in the environment of the nuclear reactor which is distinctly improved. However, the hardness and the resistance to wear of the surface layer are lower than those of sheaths of alloy of conventional type.

Consequently, when loading a fuel assembly with new rods or when replacing rods in a worn fuel assembly, the sheaths of the rods undergo, on their outer surface, increased wear which may result in defects and increased local corrosion.

SUMMARY OF THE INVENTION

An object of the invention is therefore to provide a rod for a fuel assembly of a nuclear reactor containing a nuclear fuel material, inside a sheath comprising an inner tubular layer and a surface or outer layer of zirconium alloys which are different from each other, said rod having a resistance to external corrosion and to wear which is distinctly improved both with respect to rods whose sheath is constituted by a homogeneous tube of zirconium alloy of conventional type and with respect to rods having a sheath constituted by a duplex tube.

For this purpose, the surface or outer layer having a thickness of between 10 and 25% of the total thickness of the wall of the sheath is constituted by a zirconium-base alloy containing 0.35 to 0.65% by weight tin, 0.20 to 0.65% iron, 0.09 to 0.16% oxygen and niobium in a proportion of 0.35 to 0.65% or vanadium in a proportion of 0.25 to 0.35%.

The invention also relates to a fuel rod whose sheath comprises an inner tubular layer constituted by a zirconium alloy including 0.8 to 1.2% niobium and a surface or outer layer according to the principal characteristic of the invention.

DESCRIPTION OF PREFERRED EMBODIMENTS

In order that the invention may be more celarly understood, there will now be described by way of example several embodiments of a fuel rod according to the invention intended for a fuel assembly in a pressurized water nuclear reactor.

In all cases, the sheath of the fuel rod according to the invention is produced by the extrusion and then rolling in a step-by-step rolling mill of a blank constituted by a tubular core of zirconium alloy on which is mounted an outer tube having a composition corresponding to the composition of the surface or outer layer defined hereinabove.

In its final state, the sheath of the fuel rod according to the invention has the following dimensional characteristics: outside diameter 9.63 mm±0.04 mm, minimum total thickness of the wall of the sheath 0.605 mm, minimum thickness of the surface or outer layer 0.060 mm.

EXAMPLES 1, 2 AND 3

The inner tubular layer is made from a zirconium alloy of conventional type and currently employed in the case of the manufacture of sheaths of fuel rods for assemblies intended for pressurized water nuclear reactors.

Such a zirconium-base alloy, designated by the name Zircaloy 4, includes 1.2 to 1.7% tin, 0.18 to 0.24% iron, 0.07 to 0.13% chromium, 0.0080 to 0.00200% carbon, 0.0050 to 0.012% silicon and 0.0900 to 0.1600% oxygen, the indicated percentages being percentages by weight, the total of the percentages by weight of the iron and chromium components being between 0.28 and 0.37%. The balance is constituted by the zirconium apart from inevitable impurities in very low proportions.

The following table indicates the compositions (in percentages by weight) of three surface layers respectively corresponding to the Examples 1, 2 and 3 of the invention, these layers having, relative to one another, certain differences in composition concerning the addition elements introduced or the percentages by weight of these elements.

|       | Sn        | Fe        | Cr | O         | Nb        | V         | Zr      |
|-------|-----------|-----------|----|-----------|-----------|-----------|---------|
| EX. 1 | 0.35/0.65 | 0.22/0.28 | —  | 0.09/0.16 | 0.35/0.65 | —         | BALANCE |
| EX. 2 | 0.35/0.65 | 0.35/0.45 | —  | 0.09/0.16 | 0.35/0.65 | —         | BALANCE |
| EX. 3 | 0.35/0.65 | 0.55/0.65 | —  | 0.09/0.16 | —         | 0.25/0.35 | BALANCE |

The compositions of the surface layer of the fuel rods according to the invention are characterized by the presence of tin in a significant proportion of 0.35 to 0.65%, by the presence of iron in a proportion which may vary but which is always between 0.20 and 0.65%, by the absence of chromium which may only be present as residual impurities in a very small amount, and by the presence of niobium or vanadium in significant and well-determined proportions.

In all cases, the simultaneous presence of tin and an element such as niobium or vanadium permits obtaining both very satisfactory mechanical characteristics and in particular high hardness and corrosion resistance characteristics comparable to those of zirconium alloys including vanadium and devoid of tin.

The vanadium and niobium permit reducing the surface absorption of hydrogen by the sheath and therefore improve the corrosion resistance in the environment of the reactor.

After its forming and heat treatment, the duplex sheath of the fuel rod according to the invention has on the whole a homogeneous crystalline structure in the form of a recrystallized phase.

EXAMPLES 4, 5 AND 6

In these examples of a fuel rod according to the invention, the inner tubular layer is constituted by a zirconium-base alloy including substantially 1% niobium, to the exclusion of any other metal alloy element in a significant quantity.

This inner layer has in all cases the following composition by weight: niobium 0.8 to 1.2%, oxygen 0.09 to 0.16%, the balance being constituted by the zirconium apart from inevitable impurities in very small amounts.

The sheaths of the fuel rods according to Examples 4, 5 and 6 differ from one another by the composition of their surface layer.

In the case of Example 4, the surface layer has the composition mentioned hereinbefore in Example 1. Likewise, the surface layer of the sheaths of the rods according to Examples 5 and 6 have the compositions mentioned hereinbefore in Examples 2 and 3, respectively.

In the final state, the sheath has an entirely recrystallized structure.

Tests carried out to ascertain the corrosion resistance at 400° C. have shown that the composite sheaths of the rods according to the invention have characteristics which are distinctly improved over those of sheaths of Zircaloy 4.

Moreover, the resistance to creep at 400° C. of the sheaths of fuel rods comprising an inner layer of zirconium-niobium alloy is very much higher than the resistance to creep of homogeneous or composite sheaths of Zircaloy 4.

Furthermore, according to a particular advantage of the invention, the alloy Zr-Nb markedly reduces the risk of corrosion under stress due to the interaction between the pellet and the sheath, since this alloy has a lower relative ductility loss than that of alloys of the prior art.

In all cases, the hardness of the surface layer at low or high temperature is very much higher than the hardness of the corresponding surface layer of composite sheaths according to the prior art.

The scope of the invention is not intended to be limited to the described examples.

Thus, it is possible to employ an inner layer constituted by a zirconium alloy such as Zircaloy 2 including 1.2 to 1.7% tin, 0.07 to 0.2% iron, 0.05 to 0.15% chromium, 0.03 to 0.08% nickel and 0.07 to 0.15% oxygen, the sum of the percentages by weight of iron, chromium and nickel being between 0.18 and 0.38%.

It is also possible, as concerns the surface or outer layer, to select more precise composition limits within the limits given hereinbefore.

The fuel rods according to the invention may be employed both in the case of fuel assemblies for pressurized water nuclear reactors and in the case of fuel assemblies for boiling water nuclear reactors.

We claim:

1. Rod for a fuel assembly of a nuclear reactor, said rod comprising a sheath having a wall and a nuclear fuel material within said sheath, said sheath comprising an inner tubular layer and an outer surface layer composed of zirconium alloys which layers differ from each other, said surface layer consisting of a zirconium-base alloy containing by weight 0.35 to 0.65% tin, 0.20 to 0.65% iron, 0.09 to 0.16% oxygen and an element selected from the group consisting of niobium in a proportion of 0.25 to 0.35%, the balance being constituted by zirconium apart from inevitable impurities.

2. Rod according to claim 1, wherein said surface layer consists of a zirconium-base alloy containing 0.35 to 0.65% tin, 0.22 to 0.28% iron, 0.09 to 0.16% oxygen, and 0.35 to 0.65% niobium, the balance being constituted by the zirconium apart from inevitable impurities.

3. Rod according to claim 1, wherein said surface layer consists of a zirconium-base alloy containing 0.35 to 0.65% tin, 0.35 to 0.45% iron, 0.09 to 0.16% oxygen, and 0.35 to 0.65% niobium, the balance being constituted by zirconium apart from inevitable impurities.

4. Rod according to claim 1, wherein said surface layer consists of an alloy containing 0.35 to 0.65% tin, 0.55 to 0.65% iron, 0.09 to 0.16% oxygen, and 0.25 to 0.35% vanadium, the balance being constituted by zirconium apart from inevitable impurities.

5. Rod according to claim 1, wherein said inner layer consists of a zirconium-base alloy containing 1.2 to 1.7% tin, 0.18 to 0.24% iron, 0.07 to 0.13% chromium, 0.09 to 0.16% oxygen, 0.008 to 0.02% carbon, and 0.005 to 0.012% silicon, the sum of the percentages by weight of iron and chromium being between 0.28 and 0.37%.

6. Rod according to claim 1, wherein said inner layer consists of a zirconium-base alloy containing 1.2 to 1.7% tin, 0.07 to 0.2% iron, 0.05 to 0.15% chromium, and 0.03 to 0.08% nickel.

7. Rod according to claim 1, wherein said inner layer consists of a zirconium-base alloy containing 0.8 to 1.2% niobium, 0.09 to 0.16% oxygen, the balance being constituted by zirconium apart from inevitable impurities.

8. Rod according to claim 1, wherein said outer surface layer has a thickness between 10 and 25% of the total thickness of the wall of the sheath.

* * * * *